(12) United States Patent
Myers et al.

(10) Patent No.: US 11,548,052 B2
(45) Date of Patent: Jan. 10, 2023

(54) SELF-LUBRICATING CONNECTOR

(71) Applicant: TE Connectivity Services GmbH, Schaffhausen (CH)

(72) Inventors: Marjorie Kay Myers, Mount Wolf, PA (US); Nathan Philip Myer, Middletown, PA (US)

(73) Assignee: TE Connectivity Solutions GmbH

( * ) Notice: Subject to any disclaimer, the term of this patent is extended or adjusted under 35 U.S.C. 154(b) by 373 days.

(21) Appl. No.: 16/831,175

(22) Filed: Mar. 26, 2020

(65) Prior Publication Data
US 2021/0299730 A1 Sep. 30, 2021

(51) Int. Cl.
| | |
|---|---|
| *B21D 37/18* | (2006.01) |
| *F16N 11/04* | (2006.01) |
| *H01R 13/187* | (2006.01) |
| *H01R 13/05* | (2006.01) |
| *H01R 13/62* | (2006.01) |

(52) U.S. Cl.
CPC .............. *B21D 37/18* (2013.01); *F16N 11/04* (2013.01); *H01R 13/052* (2013.01); *H01R 13/187* (2013.01); *H01R 13/62* (2013.01)

(58) Field of Classification Search
None
See application file for complete search history.

(56) References Cited

U.S. PATENT DOCUMENTS

| | | | |
|---|---|---|---|
| 4,166,878 A | | 9/1979 | Risser et al. |
| 4,168,878 A | * | 9/1979 | Risser .................. H01R 13/111 439/200 |
| 5,899,765 A | * | 5/1999 | Niekrasz .............. H01R 13/523 439/201 |
| 6,196,854 B1 | * | 3/2001 | Hand .................... H01R 13/523 439/138 |
| 9,590,340 B2 | * | 3/2017 | Blumenschein ....... H01R 13/05 |
| 9,972,928 B1 | | 5/2018 | Kanzaki et al. |
| 2015/0357737 A1 | | 12/2015 | Sunaga et al. |
| 2018/0333815 A1 | | 11/2018 | Saito |

FOREIGN PATENT DOCUMENTS

| | | |
|---|---|---|
| CN | 109586078 A | 4/2019 |
| JP | H0737636 A | 2/1995 |
| JP | H08163756 A | 6/1996 |
| JP | 2008053159 A | 3/2008 |
| JP | 2014078402 A | 5/2014 |

OTHER PUBLICATIONS https://en.wikipedia.org/wiki/Silicone_oil, retrieved Aug. 8, 2022.*
International Search Report, International Application No. PCT/IB2021/052216, International dated Mar. 17, 2021.

* cited by examiner

*Primary Examiner* — Ross N Gushi

(57) ABSTRACT

A self-lubricating connector with a housing having a contact receiving cavity with a contact provided therein. A lubricating device is positioned in the housing proximate the contact. The lubricating device extends into the contact receiving cavity and has lubricant provided therein. The lubricant from the lubricating device is deposited or on the outside surface of the contact as the contact is moved between the first position and the second position, reducing wear on the contacts as the contacts are moved between the first position and the second position.

14 Claims, 10 Drawing Sheets

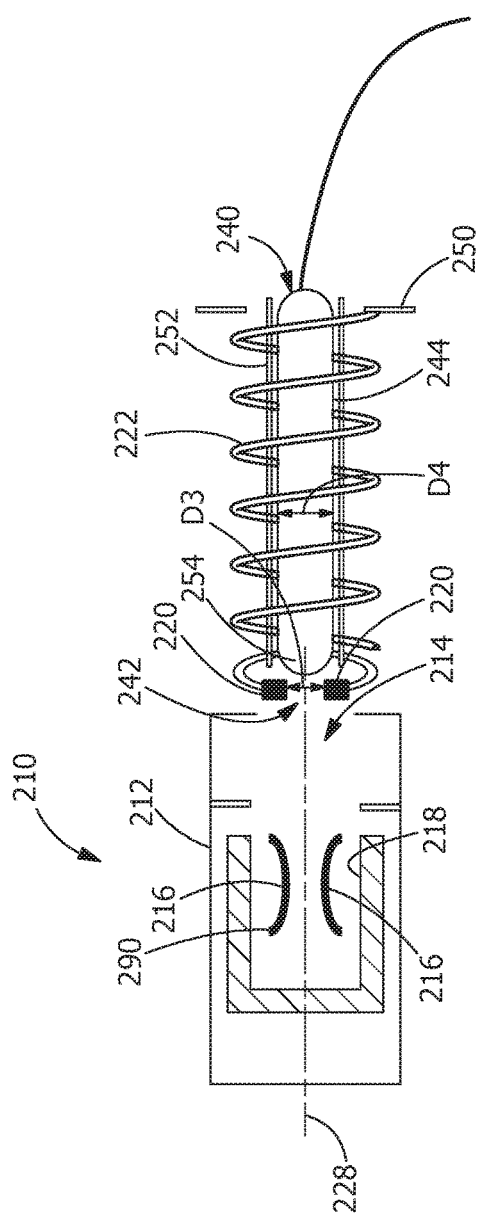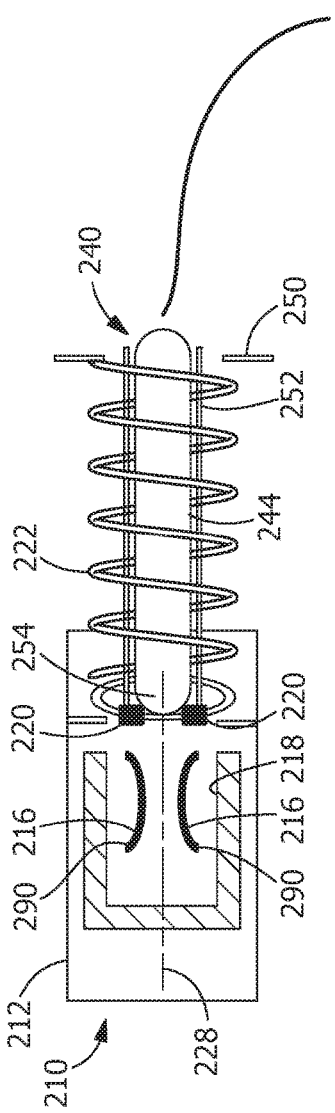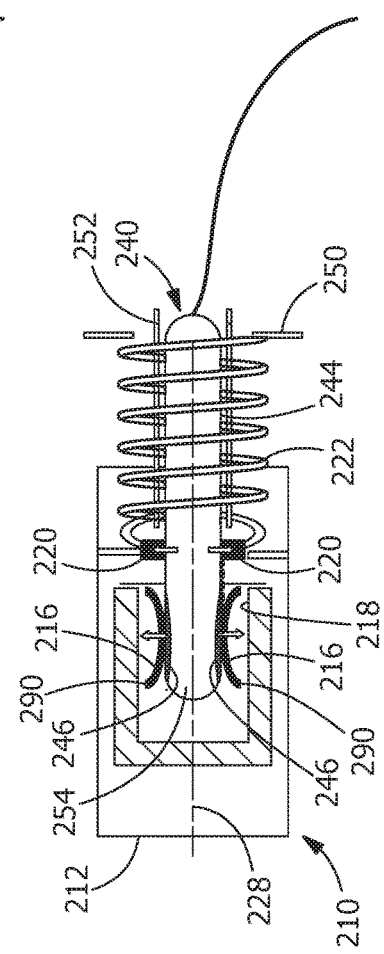

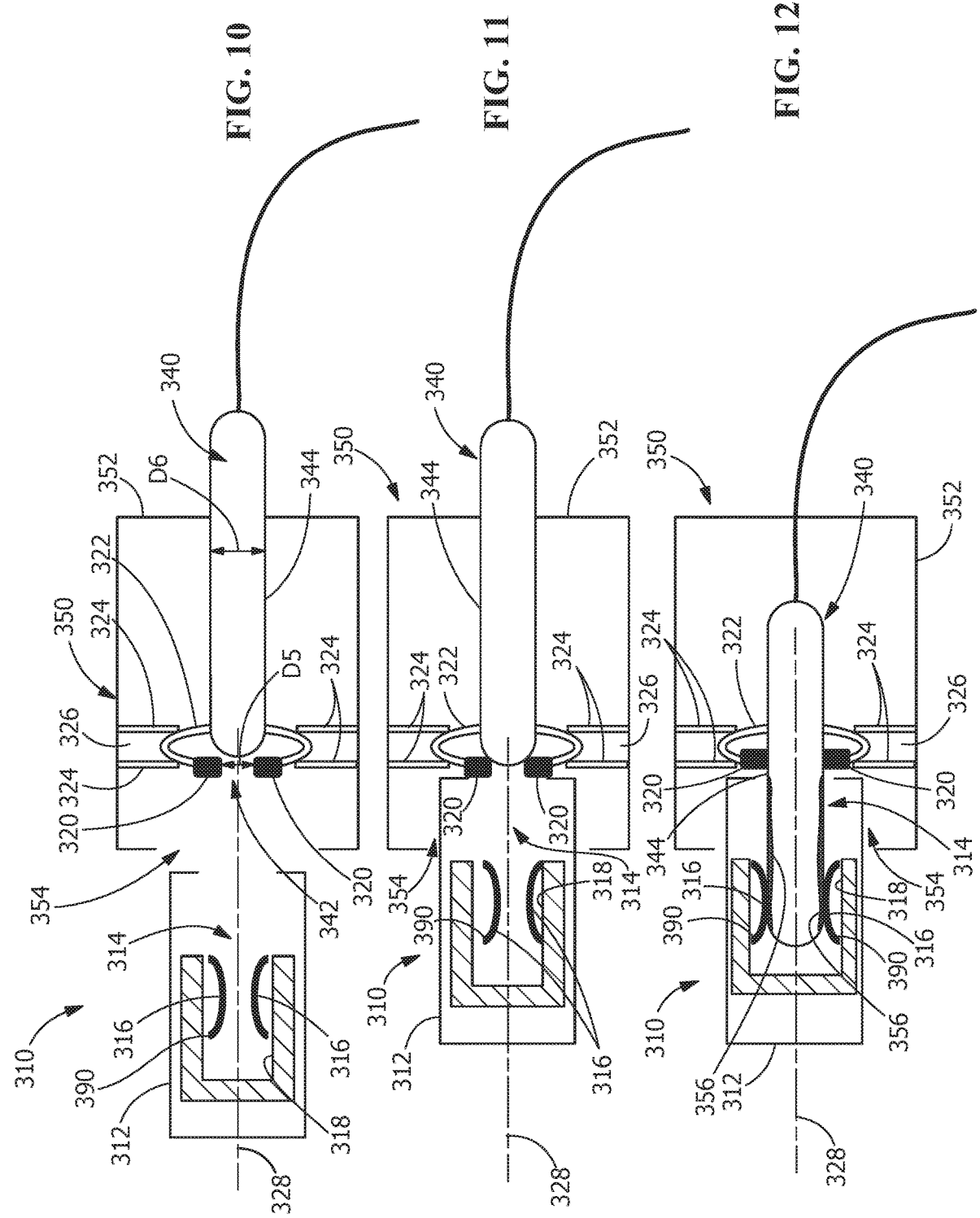

SELF-LUBRICATING CONNECTOR

FIELD OF THE INVENTION

The present invention is directed a lubricating connector having a lubricating device which applies lubrication on an outside surface of a contact as the contact is moved between the first position and the second position, reducing wear on the contacts as the contacts are moved between the first position and the second position.

BACKGROUND OF THE INVENTION

Durability and insertion force performance of electrical connections are technical challenges that can limit the lifetime use of components used in applications such as, but not limited to, high power motors, hybrid and electric mobility solutions, appliances, industrial and communications. These applications require stable electrical and mechanical contact performance, as well as a potentially higher contact pin counts.

To enhance the performance of such connections, a lubricant may be used to reduce the mating interface friction, wear, and increase mating cycle performance. In particular, for noble metal plated connectors, an effective lubricant reduces the potential for noble metal wear during mating and separation. Lubricants can also be used to mitigate corrosion degradation. Lubricants can be used to enhance stable contact performance by reducing wear, and/or proving durability performance, and/or protecting from environmental exposure.

Generally, a lubricant is pre-applied when the contact is manufactured. As the connector is mated and unmated, the pre-applied lubricant is displaced or otherwise degraded and its ability to provide performance enhancement is diminished.

It would, therefore, be beneficial to provide a lubrication system and connector having a lubricating device which reduces wear on contacts of the connector as the contacts are moved between the first position and the second position. In particular, it would be beneficial to provide a self-lubricating connector which applies or deposits lubrication on an outside surface of a contact as the contact is moved between the first position and the second position.

SUMMARY OF THE INVENTION

An embodiment is directed to a self-lubricating connector with a housing having a contact receiving cavity with a contact provided therein. A lubricating device is positioned in the housing proximate the contact. The lubricating device extends into the contact receiving cavity and has lubricant provided therein. The lubricant from the lubricating device is deposited or on the outside surface of the contact as the contact is moved between the first position and the second position, reducing wear on the contacts as the contacts are moved between the first position and the second position.

An embodiment is directed to a self-lubricating connector assembly which has a first connector having a first contact receiving cavity and a first contact provided therein, and a second connector having a second contact receiving cavity and a second contact provided therein. A lubricating device is positioned in either the first connector or the second connector and extends into either the first contact receiving cavity or the second contact receiving cavity. The lubricating device has lubricant provided therein. A resilient member is attached to the lubricating device. The resilient member is configured to allow the lubricating device to be positioned in contact with an outside surface of either the first contact of the second contact when the first contact and the second contact are moved into electrical and mechanical engagement with each other. The lubricant from the lubricating device is deposited or on the outside surface of either the first contact of the second contact as the contacts are moved between the first position and the second position. The lubricant on the outside surface of either the first contact of the second contact reduces wear on the first contact and the second contact as the contacts are moved between the first position and the second position.

An embodiment is directed to a lubricating contact with one or more contact arms. Lubricating devices are positioned at mating ends of the one or more contact arms. The lubricating devices have lubricant provided therein. The lubricant from the lubricating devices is deposited on an outside surface of a mating contact as the mating contact is moved into electrical and mechanical engagement with the contact arms, reducing wear on the mating contacts and the contact arms as the mating contact and the contact are moved into and out of engagement.

An embodiment is directed to a self-lubricating connector having a contact with a lubricating device. The lubricating device is positioned proximate a mating end of the contact and has lubricant provided therein. The lubricant is transferred to a surface of the contact as the contact is mated with a mating connector, reducing wear on the contacts as the contacts are moved between the first position and the second position.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 7 shows a cross section of a third illustrative embodiment of the lubrication system to lubricate mating electrical contacts according to the present invention, the embodiment illustrates an electrical connector and a mating electrical connector with a third alternate lubricating device positioned in a mating connector shown, the connector and mating connector are shown in an unmated condition.

FIG. 8 shows a cross section of the lubrication system of FIG. 7 with the mating connector partially inserted into the connector.

FIG. 9 shows a cross section of the lubrication system of FIG. 7 with the mating connector fully inserted into the connector.

FIG. 10 shows a cross section of a fourth illustrative embodiment of the lubrication system to lubricate mating electrical contacts according to the present invention, the embodiment illustrates an electrical connector and a mating electrical connector with a fourth alternate lubricating device positioned in a mating connector shown, the connector and mating connector are shown in an unmated condition.

FIG. 11 shows a cross section of the lubrication system of FIG. 10 with the mating connector partially inserted into the connector.

FIG. 12 shows a cross section of the lubrication system of FIG. 10 with the mating connector fully inserted into the connector.

DETAILED DESCRIPTION OF THE INVENTION

Figure 1:
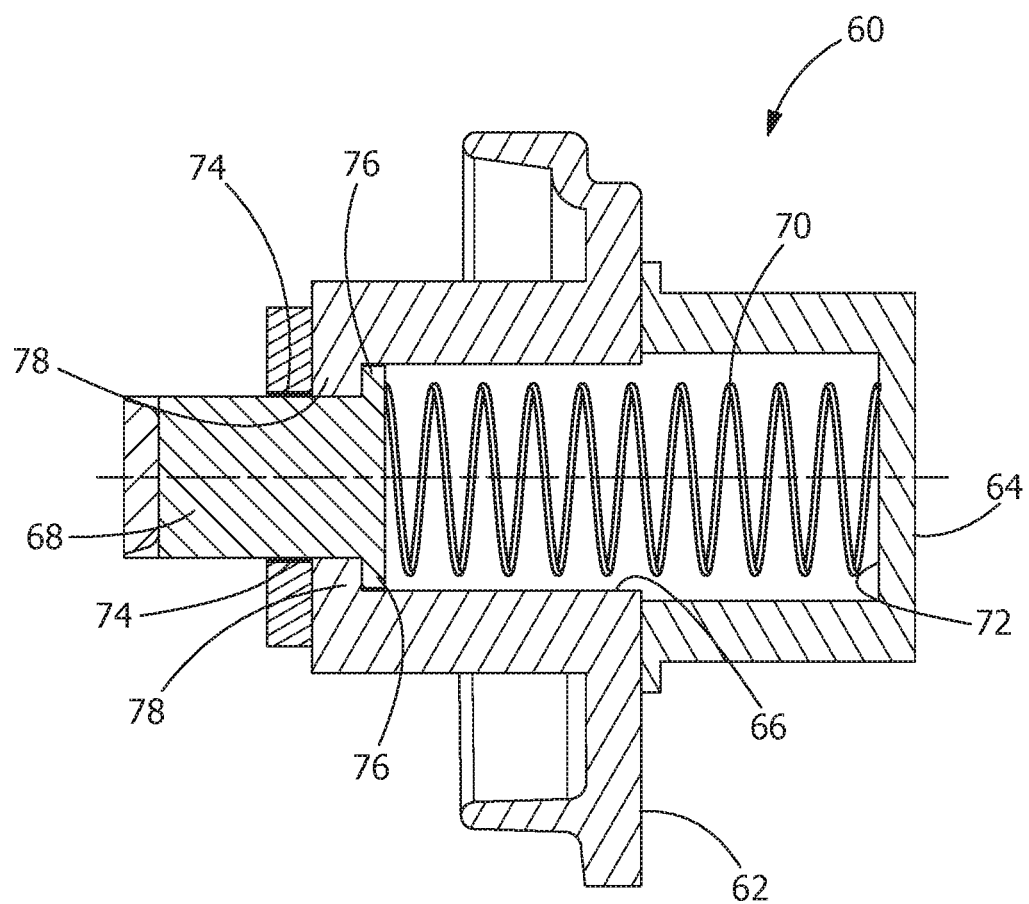
FIG. 1 shows a cross section of a first illustrative embodiment of a lubrication system to lubricate mating electrical contacts according to the present invention, the embodiment illustrates an electrical connector in an unmated condition with a lubricating device positioned in the connector shown in a first position.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 2:
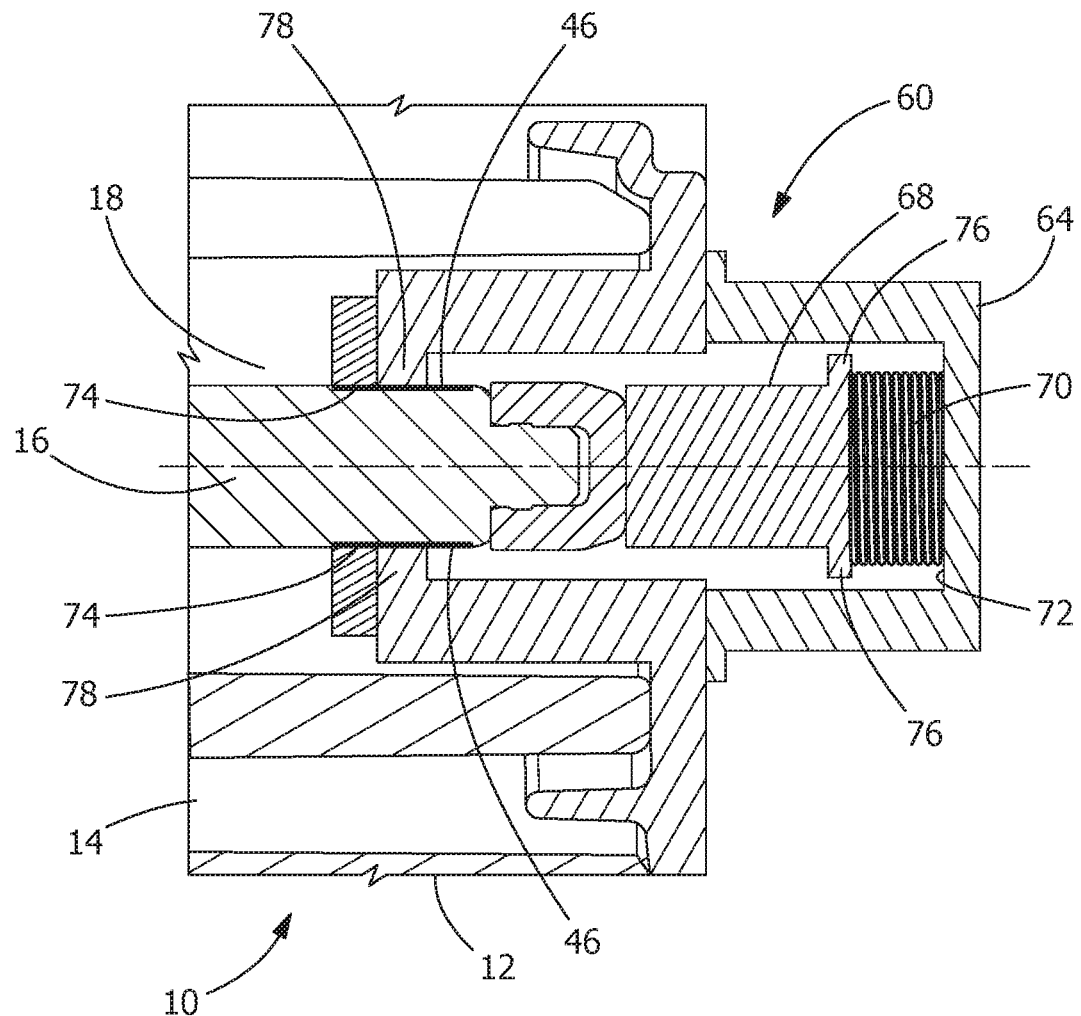
FIG. 2 shows a cross section of the lubrication system of FIG. 1 shown in a mated condition with a mating electrical contact of a mating connector in engagement with an electrical contact of the connector, the lubricating device is shown in a second position.

In the embodiment shown in FIGS. 1 and 2, a cover 60, as shown in FIG. 1, has a housing 62 with a cap 64 attached thereto. One or more lubricant receiving recesses 66 extend through the housing 62 and cap 64. Lubricating devices 68 are provided in the lubricant receiving recesses 66. In this illustrative embodiment, the lubricating devices include a solid lubricant. The solid lubricant can be any lubricant that provides lubricating properties to protect the surface to which it is applied. For example, solid lubricants such as graphite can be used. Alternatively, liquid lubricants can also be used depending upon the application.

One or move springs 70 are positioned in the lubricant receiving recesses 66. The springs 70 extend between the end wall 72 of the cap 64 and the lubricating devices 68. Lubricating receiving areas 74 are attached to the housing 62 at an opposite end of the lubricant receiving recesses 66 from the end wall 72. Lubricating receiving areas 74 are configured to receive lubricant from the lubricating devices 68. The lubricating receiving areas 74 may be, but are not limited to, felt pads.

The lubricating device 68 are moveable in the lubricant receiving recesses 66 between a first position, as shown in FIG. 1, and a second position, as shown in FIG. 2. In the first position, the projections 76 of the lubricating devices 68 are in engagement with shoulders 78 of the housing 62. In this position, further movement of the lubricating devices 68 away from the end wall 72 is prevented. In this position, the lubricating devices 68 engage the lubricating receiving areas 74. The force of the springs 70 maintains the lubricating devices 68 in the first position until a greater force is applied thereto.

In use, the cover 60 is moved into engagement with an electrical connector 10. The electrical connector 10 has a housing 12 with one or more mating contact receiving openings 14. The housing 12 has one or more electrical contacts 16 positioned in one or more electrical contact receiving cavities 18. The contacts may be made from material having the appropriate conductive properties, including, but not limited to, noble metal. In the embodiment shown, the contacts 16 are pins, however other contacts may be used without departing from the scope of the invention.

As the cover 60 and electrical connector 10 are moved together, the contacts 16 engage the lubricating devices 68. As the insertion force of the contacts on the lubricating devices 68 is greater than the spring force of the springs 70, the springs 70 are forced to compress, allowing the lubricating devices 68 to move relative to the lubricating receiving areas 74 toward the second position. As this occurs, the lubricant from the lubricating devices 68 is transferred, deposited or applied to the lubricating receiving areas 74 by a wiping action or the like. Continued movement of the contacts 16 into the cover 60 causes the contacts 16 to move into engagement with the lubricating receiving areas 74. As this occurs, the lubricant from the lubricating receiving areas 74 is transferred, deposited or applied to the contact 16 by a wiping action or the like, as represented by areas 46, as shown in FIG. 2.

As the connector 10 and contacts 16 are removed from the cover 60, the springs 70 return toward their unstressed position, causing the lubricating devices 68 to return to the first position. As the lubricating devices 68 are moved toward the first position, the lubricant from the lubricating devices 68 is again transferred, deposited or applied to the lubricating receiving areas 74 by a wiping action or the like.

Transferring the lubricant on the lubricating receiving areas 74 and on the contacts 16 minimizes wear on the contacts 16 when the contacts 16 are mated with mating contacts, thereby allowing the contacts 16 to be used over many cycles.

The cover 60 can be used over many cycles to transfer, deposit or apply the lubricant on the contacts 16. In addition, the lubricant devices 68 may be replaced as necessary by removing the cap 64 from the housing 62 to access and replace the lubricant devices 68.

Figure 3:
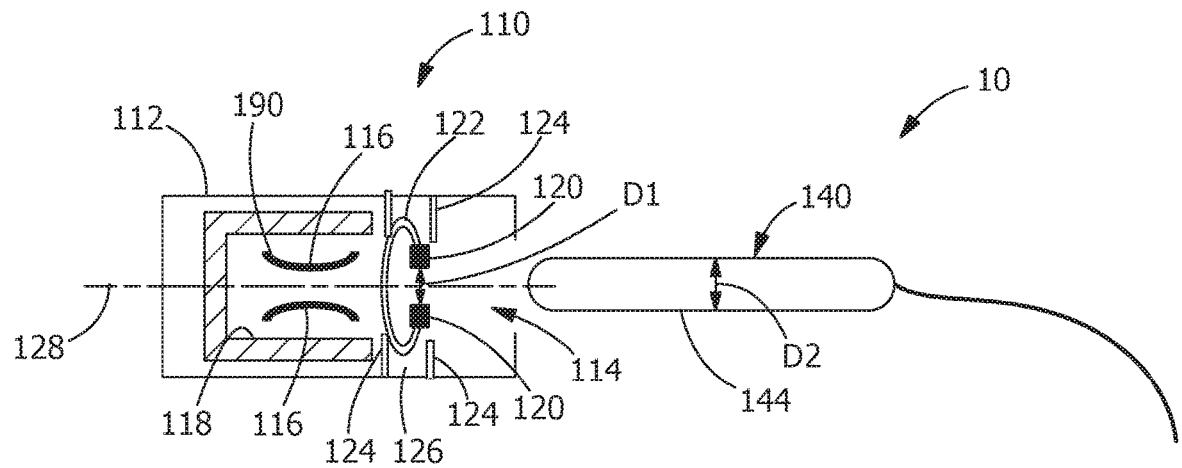
FIG. 3 shows a cross section of a second illustrative embodiment of the lubrication system to lubricate mating electrical contacts according to the present invention, the embodiment illustrates an electrical connector and mating electrical connector in an unmated condition with a second alternate lubricating device positioned in the connector.
Figure 4:
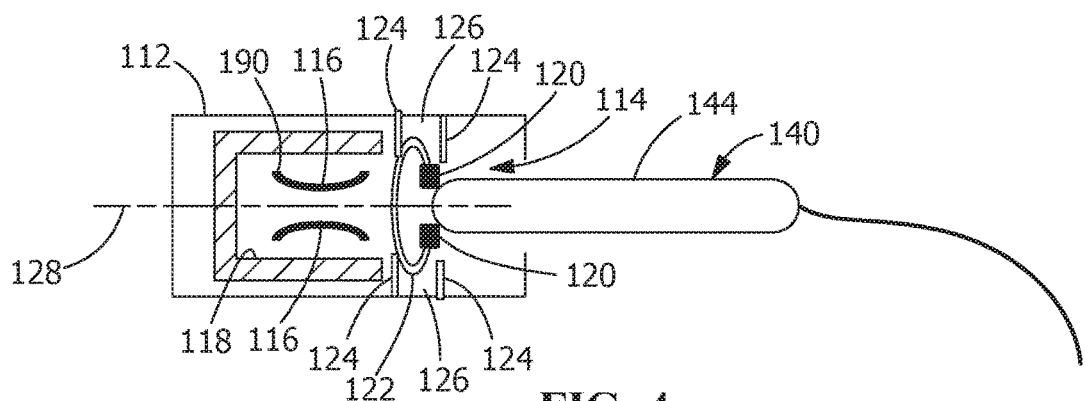
FIG. 4 shows a cross section of the lubrication system of FIG. 3 with the mating connector partially inserted into the connector.
Figure 5:
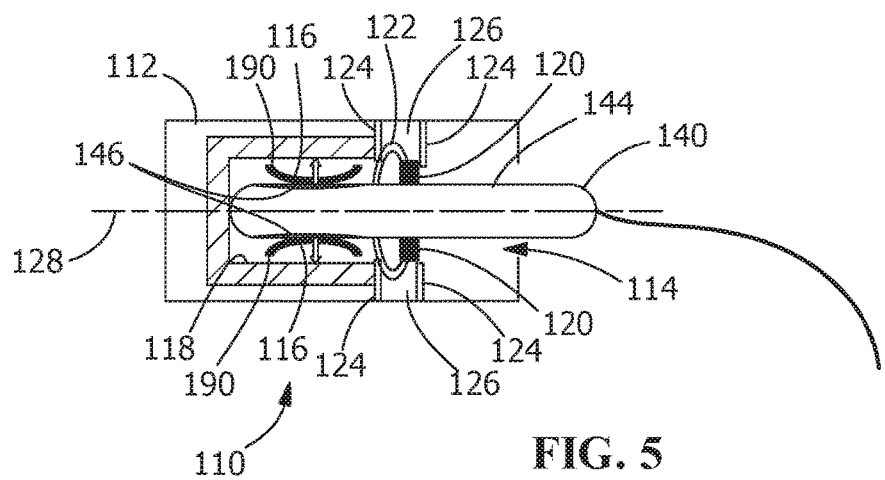
FIG. 5 shows a cross section of the lubrication system of FIG. 3 with the mating connector fully inserted into the connector.

In the embodiment shown in FIGS. 3 through 5, the electrical connector 110 has a housing 112 with one or more mating contact receiving openings 114. The housing 112 has one or more electrical contacts 116 positioned in one or more electrical contact receiving cavities 118. In the embodiment shown, the contacts 116 are spring contacts, however other contacts may be used without departing from the scope of the invention.

Positioned between the mating contact receiving openings 114 and the electrical contacts 116 are one or more lubricating devices 120. In this illustrative embodiment, the lubricating devices include a solid lubricant. The solid lubricant can be any lubricant that provides lubricating properties to protect the surface to which it is applied and to provide smooth operation over extended mating and unmating of the connector 110. For example, solid lubricants such graphite can be used. Alternatively, liquid lubricants can also be used depending upon the application.

In the embodiment shown in FIGS. 3 through 5, the one or more lubricating devices 120 extend from ends of one or more resilient or spring members 122. Walls or projections 124 are provided in the housing 112 to form a spring receiving recess 126 which receives and maintains the spring members 122 in position relative to the mating contact receiving openings 114 and the electrical contacts 116, preventing the spring members 122 from moving is a direction which is parallel to the longitudinal axis 128 of the housing 112, while allowing the spring members 122 to resiliently deform in a direction which is essentially perpendicular to the longitudinal axis 128 of the housing 112. The springs members 122 may be retained in the spring receiving recesses 126 by friction or other known means.

Figure 6:
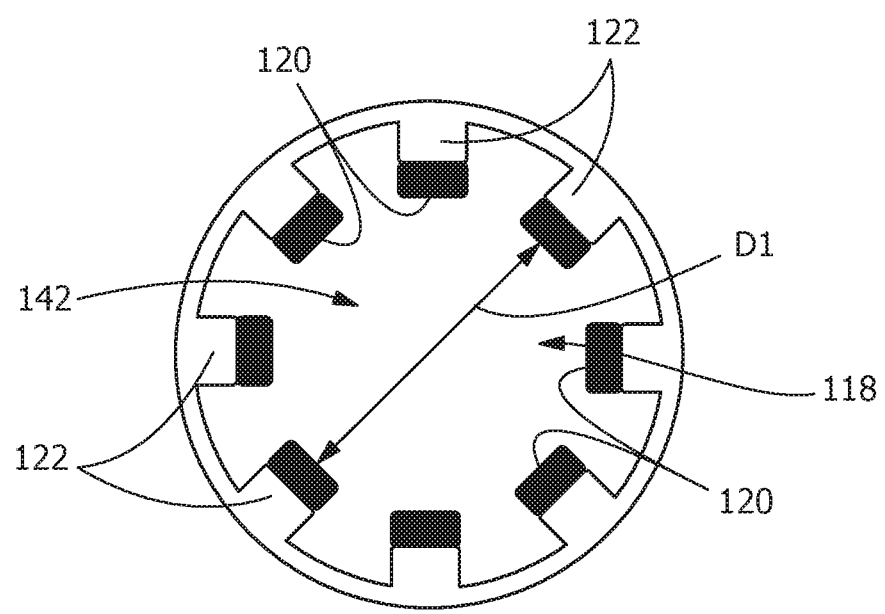
FIG. 6 shows a cross section of lubricating device taken along line 6-6 of FIG. 3.

As shown in FIG. 6, the lubricating devices 120 may be positioned at different locations about the circumference of the contact receiving cavities 118. The lubricating devices 120 extend into the contact receiving cavities 118. The number and positioning of the lubricating devices 120 may vary according to the particular application and environment in which the connector 110 is to be used. In the embodiment shown, eight lubricating devices 120 are provided to provide eight points of contact between the lubricating devices 120 and the mating contact. However, other numbers of lubricating devices 120 may be used without departing from the scope of the invention.

In use, one or more mating contacts 140 are inserted into the connector housing 112 and make an electrical connection with the one or more contacts 116. The mating contacts 140 may be housed in a mating connector, which is not shown in the figures. In the embodiment shown, the mating contacts 140 are pins, but other configurations of the mating contacts may be used.

The mating contacts 140 are inserted into the mating contact receiving opening 114, as shown in FIG. 4. As this occurs, the mating contacts 140 engage the lubricating devices 120. The openings 142 between the lubricating devices 120, as shown in FIG. 6, have diameters D1 which are dimensioned to be smaller than the diameters D2 of the mating contacts 140, as shown in FIG. 3. Therefore, as the mating contacts 140 are inserted through the openings 142, the lubricating devices 120 are displaced, causing the spring members 122 to resiliently deform. As this occurs, the continued insertion of the mating contacts 140 toward the contact 116 causes the lubricating devices 120 to engage and exert a force on the outside surfaces 144 of the mating contacts 140. The continued insertion of the mating contacts 140 results in the lubricant from the lubricating devices 120 being deposited or applied on the outside surfaces 144 of the mating contacts 140, as represented by areas 146 of the mating contact 140, as shown in FIG. 5. The mating contacts 140 with the applied lubricant coating 146 thereby mates with the contact 116.

In addition, as the mating contacts 140 are removed from the contacts 116 and the housing 112, the mating contacts 140 again engage the lubricating devices 120. As this occurs, the removal of the mating contacts 140 away the contact 116 causes the lubricating devices to engage and exert a force on the outside surfaces 144 of the mating contacts 140. The continued removal of the mating contacts 140 results in the lubricant from the lubricating devices 120 being deposited or applied on the outside surfaces 144 of the mating contacts 140, in similar areas as describe above.

Transferring the lubricant as the mating contacts 140 are mated and unmated minimizes wear on the mating contacts 140 and contacts 116 and allows the mating contacts 140 and contacts 116 to be used over many cycles.

In the embodiment shown in FIGS. 7 through 9, the electrical connector 210 has a housing 212 with one or more mating contact receiving openings 214. The housing 212 has one or more electrical contacts 216 positioned in one or more electrical contact receiving cavities 218. In the embodiment shown, the contacts 216 are spring contacts, however other contacts may be used without departing from the scope of the invention.

One or more mating contacts 240 are mounted in a housing or on a panel 250. The mating contacts 240 are inserted into the connector housing 212 and make an electrical connection with the one or more contacts 216. In the embodiment shown, the mating contacts 240 are pins, but other configurations of the mating contacts may be used.

Positioned proximate the mating end 254 of the mating contacts 240 are one or more lubricating devices 220. In this illustrative embodiment, the lubricating devices 220 include a solid lubricant. The solid lubricant can be any lubricant that provides lubricating properties to protect the surface to which it is applied and to provide smooth operation over extended mating and unmating of the mating contacts 240 with the connector 210. For example, solid lubricants such as graphite can be used. Alternatively, liquid lubricants can also be used depending upon the application.

In the embodiment shown in FIGS. 7 through 9, the one or more lubricating devices 220 extend from ends of one or more spring members 222. The spring members 222 and mating contacts 240 are retained on the panel 250 which allow the spring members 222 to be resiliently deformed in a direction along the longitudinal axis 228 of the connector 210. An insulator sleeve 252 extends between the spring members 222 and the contacts 240. The spring members 222 are configured to resiliently deform or compress in a direction which is parallel to the longitudinal axis 228 of the housing 212.

Similar to the embodiment shown in FIGS. 3 through 6, the number and positioning of the lubricating devices 220 may vary according to the particular application and environment in which the connector 250 is to be used.

The mating contacts 240 are inserted into the mating contact receiving opening 214, as shown in FIG. 8. As this occurs, the mating contacts 240 engage the lubricating devices 220. The openings 242 between the lubricating devices 220, as shown in FIG. 7, have diameters D3 which are dimensioned to be smaller than the diameters D4 of the mating contacts 240. Therefore, as the mating contacts 240 are inserted through the openings 242, the lubricating devices 220 are displaced, causing the spring members 222 to resiliently deform. As this occurs, the continued insertion of the mating contacts 240 toward the contact 216 causes the lubricating devices to engage and exert a force on the outside surfaces 244 of the mating contacts 240. The continued insertion of the mating contacts 240 results in the lubricant from the lubricating devices 220 being deposited or applied on the outside surfaces 244 of the mating contacts 240, as represented by areas 246 of the mating contact 240, as shown in FIG. 9. The mating contacts 240 with the applied lubricant coating 246 thereby mates with the contact 216.

In addition, as the mating contacts 240 are removed from the contacts 216, the mating contacts 240 again engage the lubricating devices 220. As this occurs, the removal of the mating contacts 240 away the contact 216 causes the lubricating devices to engage and exert a force on the outside surfaces 244 of the mating contacts 240. The continued removal of the mating contacts 240 results in the lubricant from the lubricating devices 220 being deposited or applied on the outside surfaces 244 of the mating contacts 240, in similar areas as describe above.

Transferring the lubricant as the mating contacts 240 are mated and unmated minimizes wear on the mating contacts 240 and contacts 216 and allows the mating contacts 240 and contacts 216 to be used over many cycles.

In the embodiment shown in FIGS. 10 through 12, the electrical connector 310 has a housing 312 with one or more mating contact receiving openings 314. The housing 312 has one or more electrical contacts 316 positioned in one or more electrical contact receiving cavities 318. In the embodiment shown, the contacts 316 are spring contacts, however other contacts may be used without departing from the scope of the invention.

A mating electrical connector 350 has a housing 352 with one or more contact openings 354. The housing 352 has one or more mating contacts 340 which are inserted into the connector housing 312 and make an electrical connection with the one or more contacts 316. In the embodiment shown, the mating contacts 340 are pins, but other configurations of the mating contacts may be used.

Positioned between the mating contact openings 354 and the electrical contacts 340 are one or more lubricating devices 320. In this illustrative embodiment, the lubricating devices include a solid lubricant. The solid lubricant can be any lubricant that provides lubricating properties to protect the surface to which it is applied and to provide smooth operation over extended mating and unmating of the connector 310 and mating connector 350. For example, solid lubricants such graphite can be used. Alternatively, liquid lubricants can also be used depending upon the application.

In the embodiment shown in FIGS. 10 through 12, the one or more lubricating devices 320 extend from ends of one or more spring members 322. Walls or projections 324 are provided in the housing 312 to form a spring receiving recess 326 which receives and maintains the spring members 322 in position relative to the contact openings 314 and the electrical contacts 340, preventing the spring members 322 from moving is a direction which is parallel to the longitudinal axis 328 of the housing 352, while allowing the spring members 322 to resiliently deform in a direction which is essentially perpendicular to the longitudinal axis 328 of the housing 352. The springs members 322 may be retained in the spring receiving recesses 326 by friction or other known means.

Similar to the embodiment shown in FIGS. 3 through 5, the number and positioning of the lubricating devices 320 may vary according to the particular application and environment in which the connector 350 is to be used.

In use, one or more mating contacts 316 are inserted into the connector housing 352, as shown in FIG. 11. The mating contacts 340 are then inserted into the mating contact receiving opening 314, as shown in FIG. 12. As this occurs, the mating contacts 340 engage the lubricating devices 320. The openings 342 between the lubricating devices 320, as shown in FIG. 10, have diameters D5 which are dimensioned to be smaller than the diameters D6 of the mating contacts 340. Therefore, as the mating contacts 340 are inserted through the openings 342, the lubricating devices 320 are displaced, causing the spring members 322 to resiliently deform. As this occurs, the continued insertion of the mating contacts 340 toward the contact 316 causes the lubricating devices to engage and exert a force on the outside surfaces 344 of the mating contacts 340. The continued insertion of the mating contacts 340 results in the lubricant from the lubricating devices 320 being deposited or applied on the outside surfaces 344 of the mating contacts 340, as represented by areas 356 of the mating contact 340, as shown in FIG. 12. The mating contacts 340 with the applied lubricant coating 356 thereby mates with the contact 316.

In addition, as the mating contacts 340 are removed from the contacts 316, the mating contacts 340 again engage the lubricating devices 320. As this occurs, the removal of the mating contacts 340 away from the contact 316 causes the lubricating devices to engage and exert a force on the outside surfaces 344 of the mating contacts 340. The continued removal of the mating contacts 340 results in the lubricant from the lubricating devices 320 being deposited or applied on the outside surfaces 344 of the mating contacts 340, in similar areas as describe above.

Transferring the lubricant as the mating contacts 340 are mated and unmated minimizes wear on the mating contacts 340 and contacts 316 and allows the mating contacts 340 and contacts 316 to be used over many cycles.

Figure 13:
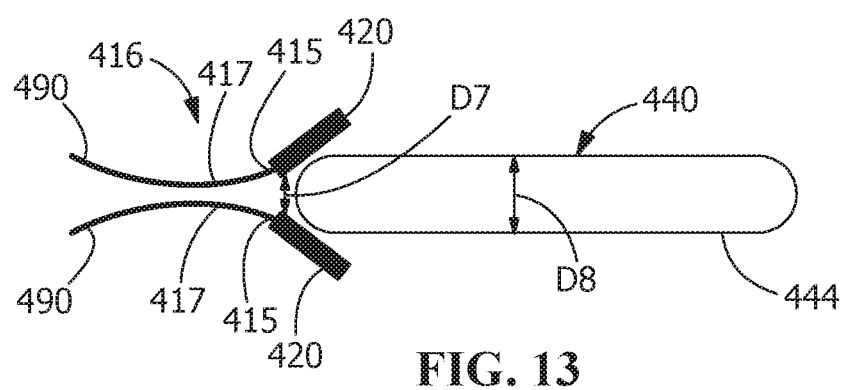
FIG. 13 shows a cross section of a fifth illustrative embodiment of the lubrication system to lubricate mating electrical contacts according to the present invention, the embodiment illustrates an electrical contact and mating electrical contact in an unmated condition with a fifth alternate lubricating device positioned on the contact.
Figure 14:
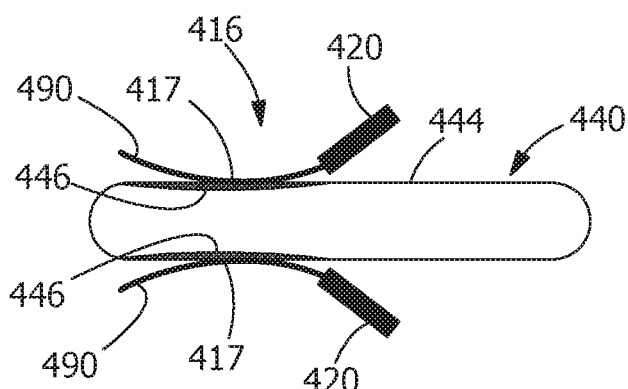
FIG. 14 shows a cross section of the lubrication system of FIG. 13 with the mating contact fully inserted into the contact.
Figure 15:
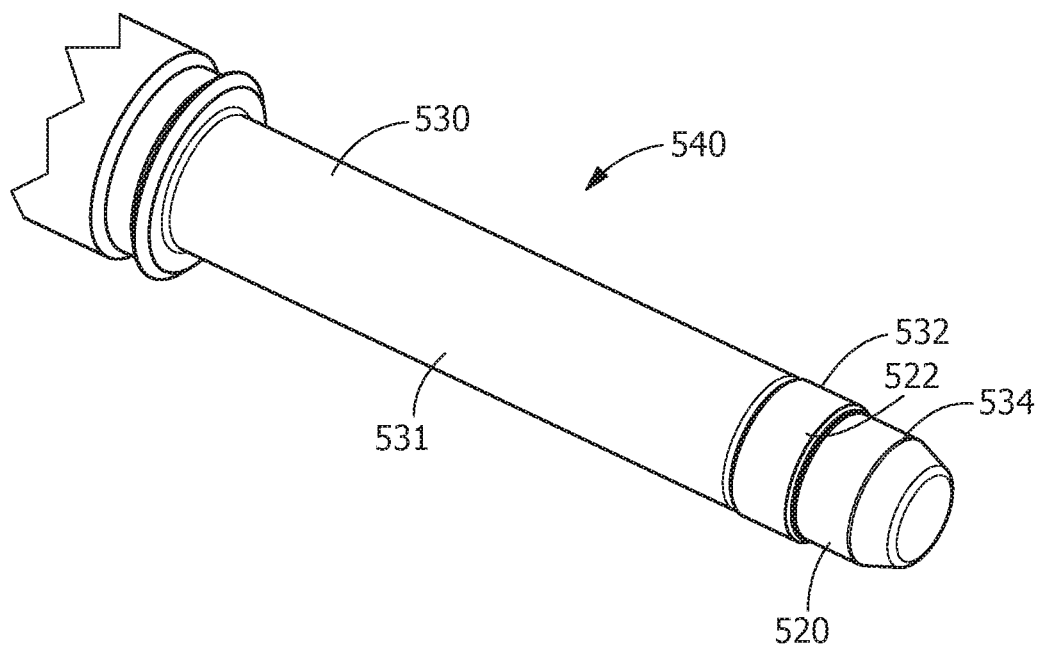
FIG. 15 shows a perspective view of a sixth illustrative embodiment of the lubrication system with an electrical contact with a lubricating device positioned thereon.

In the illustrative embodiment shown in FIGS. 13 and 14, the lubricating devices 420 are positioned at mating ends 415 of the contact arms 417 of the electrical contacts 416.

In use, one or more mating contacts 440 are inserted into and make an electrical and mechanical connection with the one or more contacts 416. In the embodiment shown, the mating contacts 440 are pins, but other configurations of the mating contacts may be used.

The mating contacts 440 are inserted between the contacts 416. As this occurs, the mating contacts 440 engage the lubricating devices 420. The lubricating devices 420 are spaced apart by a distance D7 which is dimensioned to be smaller than the diameters D8 of the mating contacts 440, as shown in FIG. 13. Therefore, as the mating contacts 440 are inserted between the contact 416, the lubricating devices 420 are displaced, causing the contact arms 417 of the contacts 416 to resiliently deform. As this occurs, the continued insertion of the mating contacts 440 causes the lubricating devices 420 to engage and exert a force on the outside surfaces 444 of the mating contacts 440. The continued insertion of the mating contacts 440 results in the lubricant from the lubricating devices 420 being deposited or applied on the outside surfaces 444 of the mating contacts 440, as represented by areas 446 of the mating contact 440, as shown in FIG. 14. The mating contacts 440 with the applied lubricant coating 446 thereby mates with the contact 416.

In addition, as the mating contacts 440 are removed from the contacts 416, the mating contacts 440 again engage the lubricating devices 420. As this occurs, the removal of the mating contacts 440 away the contact 416 causes the lubricating devices 420 to engage and exert a force on the outside surfaces 444 of the mating contacts 440. The continued removal of the mating contacts 440 results in the lubricant from the lubricating devices 420 being deposited or applied on the outside surfaces 444 of the mating contacts 440, in similar areas as describe above.

Transferring the lubricant as the mating contacts 440 are mated and unmated minimizes wear on the mating contacts 440 and contacts 416 and allows the mating contacts 440 and contacts 416 to be used over many cycles.

In addition to providing proper lubrication, the embodiments shown in FIGS. 3 through 12 can also measure voltage drop. As the lubricating devices 120, 220, 320, 420 are in engagement with the mating contact 140, 240, 340, 440, the lubricating devices 120, 220, 320, 420 can be used as a first voltage pick off point to measure a first voltage of the mating contact 140, 240, 340, 440. A point 190, 290, 390, 490 at the back of the contacts 116, 216, 316, 416 can be used as a second voltage pick off point to measure a second voltage at the back of the contacts 116, 216, 316, 416. By measuring the voltage at each point and comparing the measured voltages with known devices, the voltage drop can be determined.

In the embodiment shown in FIGS. 15 through 18, the electrical connector 510 has a housing 512 with one or more mating contact receiving openings 514. The housing 512 has one or more electrical contacts 516 positioned in one or more electrical contact receiving cavities 518. In the embodiment shown, the contacts 516 are spring contacts, however other contacts may be used without departing from the scope of the invention.

Each of the mating contacts 540, which may be housed in a mating connector (not shown) include a contact section 530, a lubricating section 532 and a lead-in section 534. The contact section 530 is made from conductive material, such as, but not limited to, silver plated copper. The lead-in section 534 is made from non-conductive material, such as, but not limited to, plastic.

The lubricant section 532, which is provided proximate a free end of the mating contact 540, includes one or more lubricating devices 520. In this illustrative embodiment, the lubricating devices include a solid lubricant which is positioned in line with an outer surface 531 of the contact section 530. The solid lubricant can be any lubricant that provides lubricating properties to protect the surface to which it is applied and to provide smooth operation over extended mating and unmating of the mating contact 540. The solid lubricant may be, but is not limited to, graphite. Alternatively, liquid lubricants can also be used depending upon the application. The lubricating device 520 may have a solid outer surface 522 or have projections (not shown) positioned at different locations about the circumference of the outer surface 522.

In use, one or more mating contacts 540 are inserted into the connector housing 512 and make an electrical connection with the one or more contacts 516. In the embodiment shown, the mating contacts 540 are pins, but other configurations of the mating contacts may be used.

Figure 16:
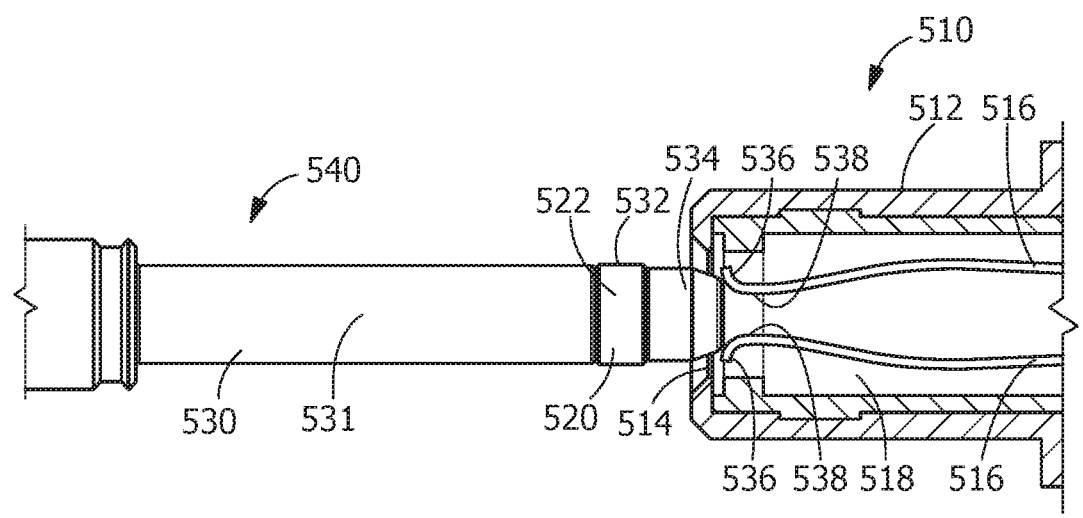
FIG. 16 shows a cross section of the sixth illustrative embodiment of the lubrication system with the electrical contact of FIG. 15, the electrical contact and the connector are shown in an unmated condition.
Figure 17:
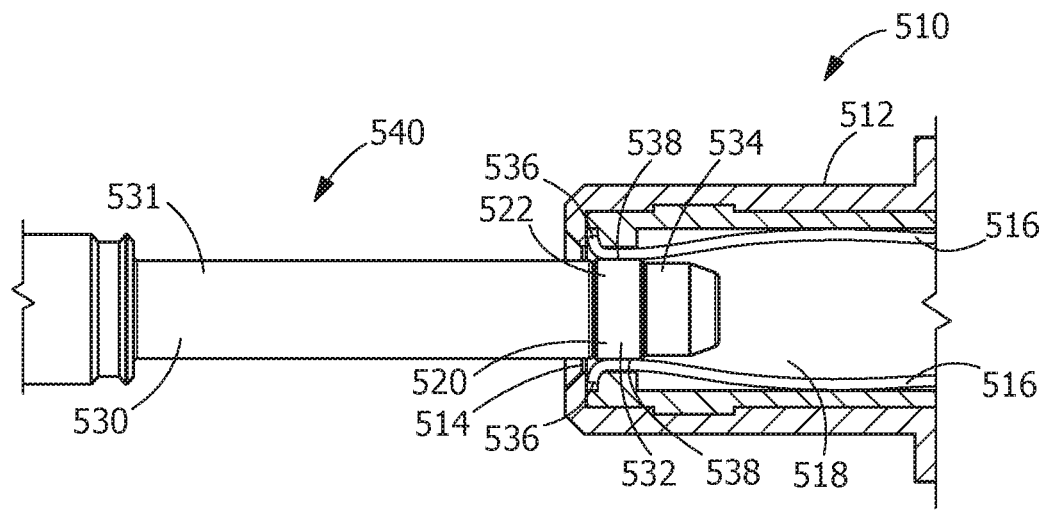
FIG. 17 shows a cross section of the lubrication system of FIG. 16 with the mating connector partially inserted into the connector.
Figure 18:
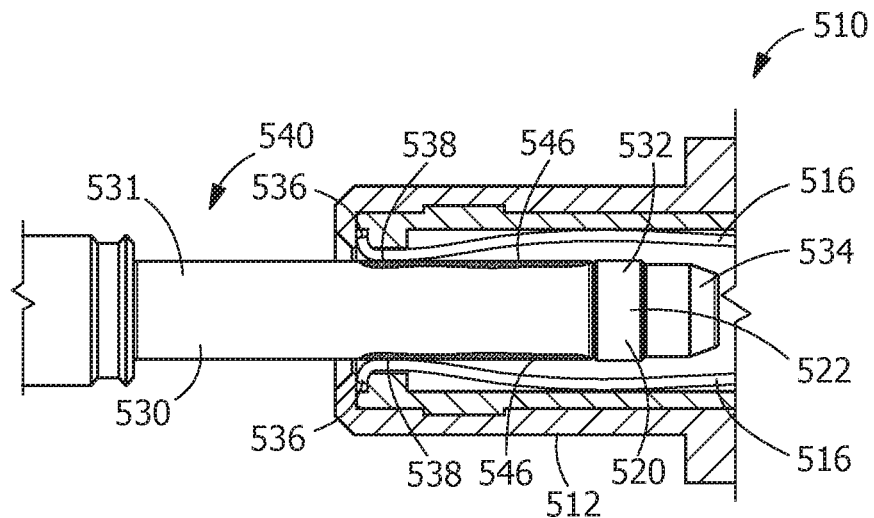
FIG. 18 shows a cross section of the lubrication system of FIG. 16 with the electrical contact fully inserted into the connector.

As shown in FIG. 16, the mating contact 540 is inserted into the mating contact receiving opening 514 of the housing 512. As this occurs, the lead-in section 534 of the mating contact 540 engages ends 536 of the contacts 516, causing the ends 536 to be moved apart and causing the contacts 516 to elastically move from an unstressed position (FIG. 16) to a stressed position (FIGS. 17 and 18). With continued insertion, contact portions 538 of the contacts 516 are moved into engagement with the mating contact 540. As the contacts 516 are in a stressed position, the contact portions 538 exert a normal force on the mating contact 540, thereby ensuring that the contact portions 538 remain in mechanical engagement with the mating contact 540.

Continued insertion of the mating contact 540 causes the contact portions 538 to be moved across the lubricating device 520 of the lubricating section 532 of the mating contact 540. As the contact portions 538 exert a normal force on the lubricating device 520, the continued insertion of the mating contact 540 results in the lubricant from the lubricating devices 520 being deposited or applied on the contact portions 538 of the contacts 516, causing the contact portions 538 to be coated with the lubricant.

As insertion continues, the lubricating device 520 is moved past the contact portions 538, and the contact section 530 is moved into engagement with the contact portions 538. Continued insertions causes the coated contact portions 538 to slide across the outer surface 531 of the contact section 530. As the contact portions 538 continue to exert a normal force on the outer surface 531 of the contact section 530, a portion of the lubricant is transferred from the contact portions 538 to the outer surface 531 of the contact section 530, as represented by areas 546, as shown in FIG. 18.

As the mating contact 540 is removed from the contacts 516 and the housing 512, the coated contact portions 538 slide over the transfer areas 546 to facilitate the removal of the mating contact 540 from the housing 512. In addition, during removal of the mating contact 540, the contact portions 538 again engage the lubricating device 520, resulting in the lubricant from the lubricating device 520 being deposited or applied on the contact portions 538, in similar areas as describe above, thereby preparing the contact portions 538 for additional mating.

Transferring the lubricant as the mating contacts 540 are mated and unmated minimizes wear on the mating contacts 540 and contacts 516 and allows the mating contacts 540 and contacts 516 to be used over many cycles.

Figure 19:
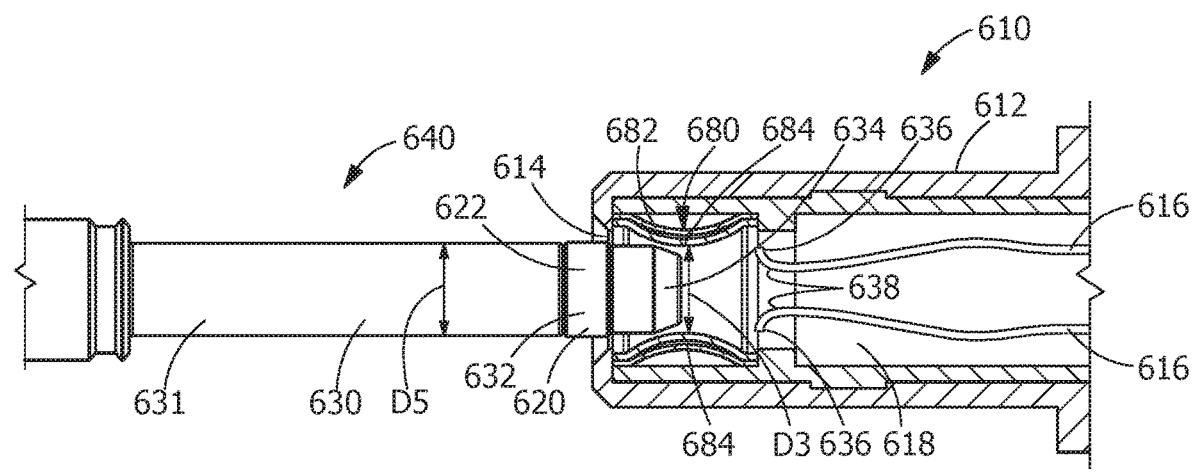
FIG. 19 shows a cross section of the seventh illustrative embodiment of the lubrication system, the electrical contact and the connector are shown in an unmated condition.
Figure 20:
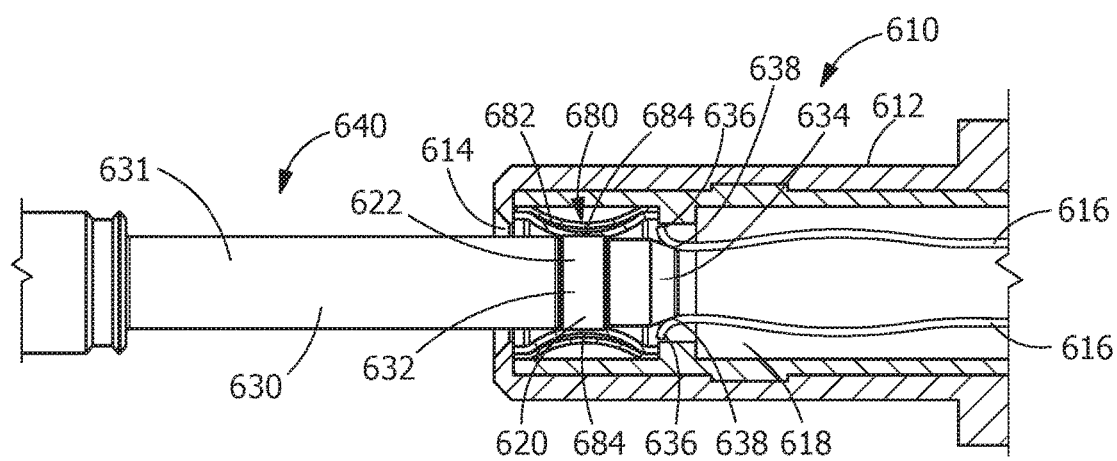
FIG. 20 shows a cross section of the lubrication system of FIG. 19 with the mating connector partially inserted into the connector.
Figure 21:
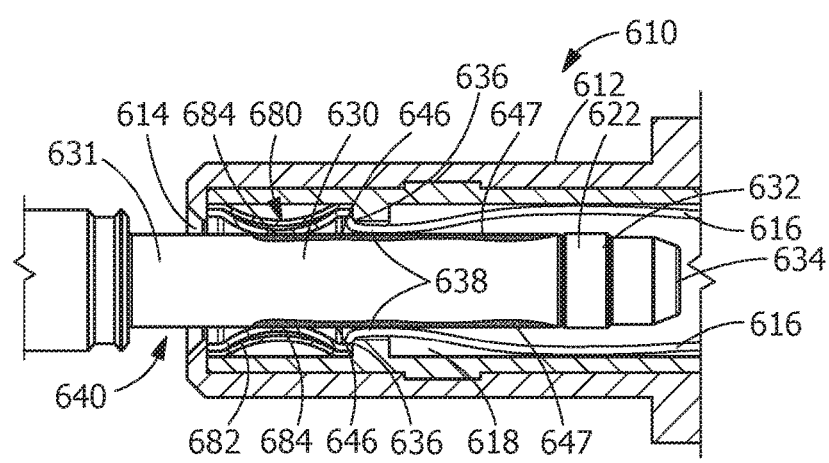
FIG. 21 shows a cross section of the lubrication system of FIG. 19 with the electrical contact fully inserted into the connector.

In the embodiment shown in FIGS. 19 through 21, the electrical connector 610 has a housing 612 with one or more mating contact receiving openings 614. The housing 612 has one or more electrical contacts 616 positioned in one or more electrical contact receiving cavities 618. In the embodiment shown, the contacts 616 are spring contacts, however other contacts may be used without departing from the scope of the invention. The housing 612 also contains one or more transfer mechanisms 680 which are positioned in the contact receiving cavities 618.

Each transfer mechanism 680 has a series of contact springs 682 which are positioned about the circumference of the transfer mechanism 680. The contact springs 682 have contact portions 684 which extend into the contact receiving cavities 618. The diameter D3 between the contact portions 684 is dimensioned to be smaller than the diameter D5 of a mating contact 640, as shown in FIG. 19.

Each of the mating contacts 640, which may be housed in a mating connector (not shown) include a contact section 630, a lubricating section 632 and a lead-in section 634. The contact section 630 is made from conductive material, such as, but not limited to, silver plated copper. The lead-in section 634 is made from non-conductive material, such as, but not limited to, plastic.

The lubricant section 632, which is provided proximate a free end of the mating contact 640, includes one or more lubricating devices 620. In this illustrative embodiment, the lubricating devices include a solid lubricant which is positioned in line with an outer surface 631 of the contact section 630. The solid lubricant can be any lubricant that provides lubricating properties to protect the surface to which it is applied and to provide smooth operation over extended mating and unmating of the mating contact 640. The solid lubricant may be, but is not limited to, graphite. Alternatively, liquid lubricants can also be used depending upon the application. The lubricating device 620 may have a solid outer surface 622 or have projections (not shown) positioned at different locations about the circumference of the outer surface 622.

In use, one or more mating contacts 640 are inserted into the connector housing 612 and make an electrical connection with the one or more contacts 616. In the embodiment shown, the mating contacts 640 are pins, but other configurations of the mating contacts may be used.

As shown in FIG. 19, the mating contact 640 is inserted into the mating contact receiving opening 614 of the housing 612. As this occurs, the lead-in section 634 of the mating contact 640 engages the contact portions 684 of the contact springs 682 of the transfer mechanism 680, causing the contact portions 684 to be moved apart and causing the contact springs 682 to elastically move from an unstressed position (FIG. 19) to a stressed position (FIG. 20). As the contact springs 682 are in a stressed position, the contact portions 684 exert a normal force on the mating contact 640, thereby ensuring that the contact portions 684 remain in mechanical engagement with the mating contact 640.

Continued insertion of the mating contact 640 causes the contact portions 684 to be moved across the lubricating device 620 of the lubricating section 632 of the mating contact 640. As the contact portions 684 exert a normal force on the lubricating device 620, the continued insertion of the mating contact 640 results in the lubricant from the lubricating device 620 being deposited or applied on the contact portions 684 of the contact springs 682, causing the contact portions 684 to be coated with the lubricant.

As insertion continues, the lubricating device 620 is moved past the contact portions 684, and the contact section 630 is moved into engagement with the contact portions 684. Continued insertions causes the coated contact portions 684 to slide across the outer surface 631 of the contact section 630. As the contact portions 684 continue to exert a normal force on the outer surface 631 of the contact section 630, a portion of the lubricant is transferred from the contact portions 684 to the outer surface 631 of the contact section 630, as represented by areas 646, as shown in FIG. 21.

As insertion continues, the lead-in section 634 of the mating contact 640 engages ends 636 of the contacts 616, causing the ends 636 to be moved apart and causing the contacts 616 to elastically move from an unstressed position (FIG. 20) to a stressed position (FIG. 21). With continued insertion, contact portions 638 of the contacts 616 are moved into engagement with the mating contact 640. As the contacts 616 are in a stressed position, the contact portions 638 exert a normal force on the mating contact 640, thereby ensuring that the contact portions 638 remain in mechanical engagement with the mating contact 640.

Continued insertion of the mating contact 640 causes the contact portions 638 to be moved across the lubricating device 620 of the lubricating section 632 of the mating contact 640. As the contact portions 638 exert a normal force on the lubricating device 640, the continued insertion of the mating contact 640 results in the lubricant from the lubricating devices 620 being deposited or applied on the contact portions 638 of the contacts 616, causing the contact portions 638 to be coated with the lubricant.

As insertion continues, the lubricating device 620 is moved past the contact portions 638, and the contact section 630 is moved into engagement with the contact portions 638. Continued insertions causes the coated contact portions 638 to slide across an outer surface 631 of the contact section 630. As the contact portions 638 continue to exert a normal force on the outer surface 631 of the contact section 630, a portion of the lubricant is transferred from the contact portions 638 to the outer surface 631 of the contact section 630, as represented by areas 647, as shown in FIG. 21.

As the mating contact 640 is removed from the contacts 616 and the housing 612, the coated contact portions 684 and the coated contact portions 638 slide over the transfer areas 646 and 647 to facilitate the removal of the mating contact 640 from the housing 612. In addition, during removal of the mating contact 640, the contact portions 684 and the contact portions 638 again engage the lubricating device 620, resulting in the lubricant from the lubricating device 620 being deposited or applied on the contact portions 684 and the contact portions 638, in similar areas as describe above, thereby preparing the contact portions 684 and the contact portions 638 for additional mating.

Transferring the lubricant as the mating contacts 640 are mated and unmated minimizes wear on the mating contacts 640 and contacts 616 and allows the mating contacts 640 and contacts 616 to be used over many cycles.

While the transfer mechanism 680 is used in in conjunction with spring contacts 616 in the illustrative embodiment, the use of a transfer mechanism may be used with many different types of contacts.

This invention is applicable to any mating contacts, including hermaphroditic contacts. By providing a lubricating device, the connector and/or contacts can be self-lubricating whereby when the contacts of the connector are mated or unmated, the lubricant from the lubricating device can be transferred, deposited or applied on the contacts, thereby decreasing the wear on the contacts and increasing the mating cycles and useful life of the contacts and the connector.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A self-lubricating connector comprising:
a housing having a contact receiving cavity with a contact provided therein;
a lubricating device positioned in the housing proximate the contact, the lubricating device extending from a resilient member into the contact receiving cavity, the lubricating device having a solid lubricant provided therein;
the resilient member configured to allow the lubricating device to remain in contact with an outside surface of a mating contact when the mating contact is moved between an unmated position and a mated position;
whereby the lubricant from the lubricating device is deposited on an outside surface of the mating contact as the mating contact is moved into the contact receiving cavity between the unmated position and the mated position, reducing wear on the contacts as the mating contact is moved between the unmated position and the mated position.

2. The self-lubricating connector as recited in claim 1, wherein the resilient member and the lubricating device are positioned in a recess in the housing, wherein the resilient member and the lubricating device are retained in position relative to the contact.

3. The self-lubricating connector as recited in claim 1, wherein more than one lubricating devices are positioned about the contact receiving cavity, the more than one lubricating devices provide lubrication to the outside surface of the mating contact.

4. The self-lubricating connector as recited in claim 1, wherein the lubricating device measures a first voltage of the mating contact when the mating contact is inserted into the contact, the contact measures a second voltage of the mating contact at a point at the back of the contact, wherein a comparison of the first voltage and the second voltage yields the voltage drop.

5. The self-lubricating connector as recited in claim 1, wherein the lubricating device is positioned in a cover of the housing.

6. The self-lubricating connector as recited in claim 1, wherein the lubricating device engages lubricant receiving areas as the contact is moved between the unmated position and the mated position.

7. The self-lubricating connector as recited in claim 1, wherein the lubricant is graphite.

8. A self-lubricating connector assembly comprising:
a first contact;
a connector having a contact receiving cavity and a second contact provided therein;
a lubricating device positioned in the connector and extending into the contact receiving cavity, the lubricating device having lubricant provided therein;
a resilient member attached to the lubricating device, the resilient member configured to allow the lubricating device to be positioned in contact with an outside surface of the first contact when the first contact and the second contact are moved into electrical and mechanical engagement with each other;
whereby the lubricant from the lubricating device is deposited or on the outside surface of the first contact as the first contact is moved between an unmated position and a mated position;
wherein the lubricant on the outside surface of the first contact reduces wear on the first contact and the second contact as the first contact is moved between the unmated position and the mated position;
wherein the lubricating device measures a first voltage of the first contact when the first contact is inserted into the second contact, a second voltage of the first contact is measured at a point at the back of the second contact, wherein a comparison of the first voltage and the second voltage yields the voltage drop.

9. The self-lubricating connector assembly as recited in claim 8, wherein the resilient member and the lubricating device are positioned in a recess of the first connector, wherein the resilient member and the lubricating device are retained in position relative to the first contact.

10. The self-lubricating connector assembly as recited in claim 9, wherein more than one lubricating device are positioned about the first contact receiving cavity, the more than one lubricating device provide lubrication to outside surfaces of the first contact.

11. The self-lubricating connector assembly as recited in claim 10, wherein the first contact is a pin contact.

12. The self-lubricating connector assembly as recited in claim 11, wherein the lubricating device measures a first voltage of the first contact when the first contact is inserted into the second contact, a second voltage of the second contact is measured at a point at the back of the second contact, wherein a comparison of the first voltage and the second voltage yields the voltage drop.

13. The self-lubricating connector assembly as recited in claim 8, wherein the resilient member and the lubricating device are positioned in a recess of the connector, wherein the resilient member and the lubricating device are retained in position relative to the second contact.

14. The self-lubricating connector assembly as recited in claim 13, wherein more than one lubricating device are positioned about the contact receiving cavity, the more than one lubricating device provide lubrication to the outside surfaces of the first contact.

* * * * *